United States Patent [19]

Quotschalla et al.

[11] Patent Number: 5,840,954
[45] Date of Patent: Nov. 24, 1998

[54] ENHANCING THE STORAGE STABILITY OF ORGANIC PHOSPHITES AND PHOSPHONITES

[75] Inventors: Udo Quotschalla, Heppenheim, Germany; Helmut Linhart, Reinach, Switzerland

[73] Assignee: Ciba Specialty Chemicals Corporation, Tarrytown, N.Y.

[21] Appl. No.: 129,704

[22] Filed: Sep. 30, 1993

[30] Foreign Application Priority Data

Oct. 5, 1992 [CH] Switzerland ............... 3105/92

[51] Int. Cl.$^6$ ............... C07F 9/141; C07F 9/48
[52] U.S. Cl. ............... 558/71
[58] Field of Search ............... 558/71

[56] References Cited

U.S. PATENT DOCUMENTS

| | | | |
|---|---|---|---|
| 3,553,298 | 1/1971 | Hodan et al. | 260/967 |
| 3,787,537 | 1/1974 | DeMarca | 260/954 |
| 4,116,926 | 9/1978 | York | 558/71 |
| 4,650,894 | 3/1987 | Fisch et al. | 558/71 |
| 5,342,978 | 8/1994 | Enlow et al. | 554/78 |
| 5,371,263 | 12/1994 | Quotschalla et al. | 558/71 |

FOREIGN PATENT DOCUMENTS

| | | |
|---|---|---|
| 0143464 | 6/1985 | European Pat. Off. . |
| 0158300 | 10/1985 | European Pat. Off. . |
| 0167969 | 1/1986 | European Pat. Off. . |
| 0168721 | 1/1986 | European Pat. Off. . |
| 2335520 | 11/1976 | France . |
| 1201547 | 9/1965 | Germany . |
| 49-030327 | 3/1974 | Japan ............... 558/71 |
| 1513629 | 6/1978 | United Kingdom . |
| 2014586 | 8/1979 | United Kingdom . |
| 2046273 | 11/1980 | United Kingdom . |

OTHER PUBLICATIONS

Derwent Abstract C81–35799D (1981).
Chem. Absts 13916 vol. 55 (1961).

*Primary Examiner*—Michael G. Ambrose
*Attorney, Agent, or Firm*—Luther A. R. Hall; Michele Kovaleski

[57] ABSTRACT

The invention relates to a process for stabilizing an organic phosphite or phosphonite or a mixture of organic phosphites or phosphonites against hydrolysis, which comprises adding, as the stabilizer, a compound from the class of sterically hindered amines, so that the stabilized phosphite or phosphonite contains 0.1 to 25% by weight of the amine compound (relative to the phosphite or phosphonite).

Compositions comprising organic phosphite or phosphonite and sterically hindered amines are notable for excellent hydrolytic stability and have a long shelf life even at high atmospheric humidity.

The products of the process according to the invention are very useful as stabilizers for organic material, in particular organic polymers, for example synthetic polymers, against the damaging influence of heat, oxygen and/or light.

8 Claims, No Drawings

ENHANCING THE STORAGE STABILITY OF ORGANIC PHOSPHITES AND PHOSPHONITES

The invention relates to a process for stabilizing organic phosphites and phosphonites against hydrolysis by addition of sterically hindered amines, to compositions comprising these two components, and to the use of sterically hindered amines as hydrolysis stabilizers for phosphites and phosphonites.

Organic phosphites and phosphonites are widely used as heat stabilizers for synthetic polymers.

However, preparation, storage and use of phosphites and phosphonites are impaired by the fact that these compounds hydrolyse very easily. A particular problem is storage of the material at high atmospheric humidity.

Various methods have been proposed for arriving at products having improved stability against hydrolysis; these include, apart from preparation processes leading to purer products and methods for purifying the compounds, in particular the addition of specific stabilizers which, on the one hand, reduce the tendency to hydrolyse and, on the other hand, do not result in any adverse effects during the later use of the phosphites or phosphonites.

The last-mentioned methods include the addition of amines as hydrolysis stabilizers, as described, for example, in U.S. Pat. No. 3,553,298. Further publications regarding stabilization of phosphites with amines are U.S. Pat. No. 3,787,537, EP-A-168 721 and EP-A-167 969. The recommended compounds are in particular tertiary alkanol- and alkylamines, pyridines and anilines; typical examples are triethylamine, diethanolamine, triethanolamine, di- and tri-isopropanolamine (TIPA), tetraisopropanolethylenediamine, aniline, phenylenediamine and hexamethylenetetramine. The amines are in general used in amounts of up to about 5% by weight (relative to the phosphite to be stabilized); incorporation of the amine is effected by dry milling or by dissolution in or mixing with the phosphite melt, followed by crystallization.

Other reasons for combining phosphites and phosphonites with amines, in addition to improving the hydrolytic stability, include:

amines, such as pyridine, triethylamine and triphenylamine, or quaternary ammonium salts are known as catalysts for preparing organic phosphites, see, for example, EP-A-158 300;

it is known to use, in addition to phosphites and phosphonites, further additives for stabilizing polymers, including, for example, light stabilizers of the sterically hindered amine type (HALS);

some organic phosphites are known which contain amine groups, also including 2,2,6,6-tetramethylpiperidyl groups, in the molecule in bound form; see, for example, GB-A-1 513 629 and GB-A-2 014 586.

Despite the known methods listed here for improving the hydrolytic stability of organic phosphites and phosphonites, there is a need for further improvement.

It has now been found that a surprising improvement in the hydrolytic stability of organic phosphites and phosphonites can be achieved by the addition of sterically hindered amines. Accordingly, the invention provides a process for stabilizing an organic phosphite or phosphonite or a mixture of organic phosphites or phosphonites against hydrolysis, which comprises adding, as the stabilizer, a compound from the class of sterically hindered amines, so that the stabilized phosphite or phosphonite contains 0.1 to 25% by weight of the amine compound (relative to the phosphite or phosphonite).

In general, 0.1 to 15% by weight of sterically hindered amine is added to the organic phosphite or phosphonite stabilized according to the invention, the stabilized phosphite or phosphonite preferably containing the sterically hindered amine in an amount of 0.1 to 8, in particular 0.1 to 5, especially in an amount of 0.2 to 2.5%, by weight, in each case relative to the phosphite or phosphonite.

Upon changing the reference quantity to phosphite plus amine or phosphonite plus amine, the amine content becomes 0.1 to 20; in general 0.1 to 13; preferably 0.1 to 7.4; in particular 0.1 to 4.8; especially 0.2 to 2.4%, by weight.

The sterically hindered amine can be an individual compound or a mixture of compounds. In the case of a mixture of compounds, the amounts given refer in each case to the total amount of sterically hindered amines used.

Phosphites or organic phosphites are here to be understood as meaning compounds of the formula $P(OR)_3$, in which the radicals R are hydrocarbon radicals, which may contain hetero atoms and moreover a maximum of two of the three radicals R can be hydrogen atoms. Hetero atoms can be any atoms with the exception of carbon and hydrogen, in particular the atoms N, O, F, Si, P, S, Cl, Br, Sn and I.

Phosphonites are esters of phosphonous acid of the formula $P(OR)_2R$, in which R is as defined above or can be halogen.

The phosphite or phosphonite is preferably a solid.

The sterically hindered amine can be added to the pure phosphite or phosphonite by customary mixing processes or, for example, by joint milling. Advantageously, the sterically hindered amine is admixed to the solution or melt of the phosphite or phosphonite prior to its crystallization, for example to the solution from the synthesis. It is also possible to add the sterically hindered amine during synthesis or to add it to one of the starting materials.

In a preferred embodiment, the sterically hindered amine is present in the solution or melt from which the phosphite or phosphonite is crystallized. In this case, the amount of admixed sterically hindered amine in the solution or melt is in most cases 0.1 to 50% by weight; preferably, 0.1 to 25% by weight, especially 0.5 to 20% by weight (in each case relative to the phosphite or phosphonite) are used.

The crystalline phosphite or phosphonite can then be obtained from the solution or melt in a known manner, for example by cooling and/or concentrating. It is possible to accelerate crystallization by introducing seed crystals. The solution can be concentrated, for example, by heating, applying reduced pressure, using entrainers, and/or freezing out of the solvent (cold trapping). This may be followed, if desired, by further customary workup procedures, such as filtration, drying or milling.

The product of the process according to the invention preferably contains mixed crystals of hindered amine and phosphite or phosphonite. These mixed crystals preferably amount to at least 50% by weight, in particular at least 80% by weight, of the product.

Advantageously, according to the process of the invention, no organic polymers, for example those having a molecular weight of greater than 5000, are added to the phosphite or phosphonite as further components.

A sterically hindered amine is here to be understood as meaning in particular a compound containing one or more trivalent groups of the formula I

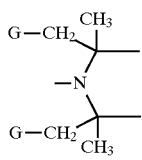
(I)

in which G is hydrogen or methyl and in which not more than one of the free valencies in formula I is saturated with hydrogen and 2 or all 3 free valencies constitute bonds to carbon or hetero atoms.

In most cases, the sterically hindered amine is a cyclic sterically hindered amine, in particular a compound from the series of polyalkylpiperidine or -piperazine derivatives containing at least one group of the formulae II or III

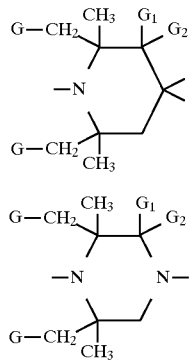

in which G is hydrogen or methyl, and $G_1$ and $G_2$ are hydrogen, methyl or together are a substituent =O; preferably the polyalkylpiperidine or -piperazine groups of the formula II or III are substituted in the 4 position by one or two polar substituents or a polar spiro ring system.

Of importance is a process in which the amine used is a cyclic sterically hindered amine containing at least one group of the formulae II or in, in which G is hydrogen and $G^1$ and $G^2$ are hydrogen or together are a substituent =O.

Particularly advantageously, derivatives of 2,2,6,6-tetramethylpiperidine are used in the process according to the invention.

Of importance is in particular the use of the classes of polyalkylpiperidines described below under (a) to (h), which carry at least one group of the formula II or III, as mentioned above:

(a) compounds of the formula IV

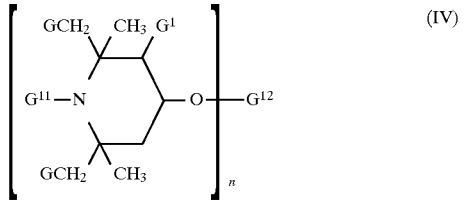

in which n is a number from 1 to 4, G and $G^1$, independently of one another, are hydrogen or methyl, $G^{11}$ is hydrogen, oxyl, hydroxyl, $C_1$–$C_{18}$allyl, $C_3$–$C_8$alkenyl, $C_3$–$C_8$alkynyl, $C_7$–$C_{12}$aralkyl, $C_1$–$C_8$alkoxy, $C_5$–$C_8$cycloalkoxy, $C_7$–$C_9$phenylalkoxy, $C_1$–$C_8$alkanoyl, $C_3$–$C_5$alkenoyl, $C_1$–$C_{18}$alkanoyloxy, benzyloxy, glycidyl or a group —$CH_2CH(OH)$—Z, in which Z is hydrogen, methyl or phenyl, $G^{11}$ being preferably H, $C_1$–$C_4$alkyl, allyl, benzyl, acetyl or acryloyl and $G^{12}$, in the case where n is 1, being hydrogen, $C_1$–$C_{18}$alkyl which may be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid, or phosphorus-containing acid, or a monovalent silyl radical, preferably a radical of an aliphatic carboxylic acid having 2 to 18 C atoms, of a cycloaliphatic carboxylic acid having 7 to 15 C atoms, of an α,β-unsaturated carboxylic acid having 3 to 5 C atoms, or of an aromatic carboxylic acid having 7 to 15 C atoms, it being possible for the carboxylic acid in each case to be substituted in the aliphatic, cycloaliphatic or aromatic portion by 1 to 3 groups —$COOZ^{12}$, in which $Z^{12}$ is H, $C_1$–$C_{20}$alyl, $C_3$–$C_{12}$alkenyl, $C_5$–$C_7$cycloalkyl, phenyl or benzyl, $G^{12}$, in the case where n is 2, being $C_2$–$C_{12}$alkylene, $C_4$–$C_{12}$alkenylene, xylylene, a divalent radical of an aliphatic, cycloaliphatic, araliphatic or aromatic dicarboxylic acid, dicarbamic acid, or phosphorus-containing acid, or a divalent silyl radical, preferably a radical of an aliphatic dicarboxylic acid having 2 to 36 C atoms, of a cycloaliphatic or aromatic dicarboxylic acid having 8–14 C atoms, or of an aliphatic, cycloaliphatic or aromatic dicarbamic acid having 8–14 C atoms, it being possible for the dicarboxylic acid in each case to be substituted in the aliphatic, cycloaliphatic or aromatic moiety by I or 2 groups —$COOZ^{12}$, $G^{12}$, in the case where n is 3, being a trivalent radical of an aliphatic, cycloaliphatic or aromatic tricarboxylic acid, which may be substituted in the aliphatic, cycloaliphatic or aromatic moiety by —$COOZ^{12}$, of an aromatic ticarbamic acid, or of a phosphorus-containing acid, or a trivalent silyl radical, and $G^{12}$, in the case where n is 4, being a tetravalent radical of an aliphatic, cycloaliphatic or aromatic tetracarboxylic acid.

The carboxylic acid radicals given include in each case radicals of the formula (—$CO)_nR$, the meaning of n being given above and the meaning of R being apparent from the definition given.

Any $C_1$–$C_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of $G^{11}$ or $G^{12}$ as $C_1$–C18alkyl can be the groups listed above and in addition, for example, n-tridecyl, n-tetradecyl, n-hexadecyl or n-octadecyl.

Examples of $G^{11}$ as $C_3$–$C_8$alkenyl can be 1-propenyl, allyl, methallyl, 2-butenyl, 2-pentenyl, 2-hexenyl, 2-octenyl, 4-tert-butyl-2-butenyl.

$G^{11}$ as $C_3$–$C_8$alkynyl is preferably propargyl.

$G^{11}$ as $C_7$–$C_{12}$aralkyl is in particular phenethyl and especially benzyl.

Examples of $G^{11}$ as $C_1$–$C_8$alkanoyl are formyl, propionyl, butyryl, octanoyl, but preferably acetyl and as $C_3$–$C_5$alkenoyl in particular acryloyl.

$G^{12}$ as a monovalent radical of a carboxylic acid is, for example, an acetic acid, caproic acid, stearic acid, acrylic acid, methacrylic acid, benzoic acid or β-(3,5-di-tert-butyl-4-hydroxyphenyl)propionic acid radical.

$G^{12}$ as a monovalent silyl radical is, for example, a radical of the formula —$(C_jH_{2j})$—Si$(Z')_2Z''$, in which j is an integer from the range 2 to 5, and Z' and Z'', independently of one another, are $C_1$–$C_4$alkyl or $C_1$–$C_4$alkoxy.

$G^{12}$ as a divalent radical of a dicarboxylic acid is, for example, a malonic acid, succinic acid, glutaric acid, adipic acid, suberic acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid radical.

$G^{12}$ as a trivalent radical of a tricarboxylic acid is, for example, a trimellitic acid, citric acid or nitrilotriacetic acid radical.

$G^{12}$ as a tetravalent radical of a tetracarboxylic acid is, for example, the tetravalent radical of butane-1,2,3,4-tetracarboxylic acid or of pyromellitic acid.

$G^{12}$ as a divalent radical of a dicarbamic acid is, for example, a hexamethylenedicarbamic acid or a 2,4-toluylenedicarbamic acid radical.

Preference is given to compounds of the formula IV in which G is hydrogen, $G^{11}$ is hydrogen or methyl, n is 2, and $G^{12}$ is the diacyl radical of an aliphatic dicarboxylic acid having 4–12 C atoms.

Examples of polyalkylpiperidine compounds of this class are the following compounds:
1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl-β-(3,5-di-tert-butyl-4-hydroxyphenyl)propionate
9) di(1-benzyl-2,2,6,6-tetramethylpiperidin-4-yl) maleate
10) di(2,2,6,6-tetramethylpiperidin-4-yl) succinate
11) di(2,2,6,6-tetramethylpiperidin-4-yl) glutarate
12) di(2,2,6,6-tetramethylpiperidin-4-yl) adipate
13) di(2,2,6,6-tetramethylpiperidin-4-yl) sebacate
14) di(1,2,2,6,6-pentamethylpiperidin-4-yl) sebacate
15) di(1,2,3,6-tetramethyl-2,6-diethylpiperidin-4-yl) sebacate
16) di(1-allyl-2,2,6,6-tetramethylpiperidin-4-yl) phthalate
17) 1-hydroxy-4-β-cyanoethyloxy-2,2,6,6-tetramethylpiperidine
18) 1-acetyl-2,2,6,6-tetramethylpiperidin-4-yl acetate
19) trimellitic acid tri(2,2,6,6-tetramethylpiperidin-4-yl) ester
20) 1-acryloyl-4-benzyloxy-2,2,6,6-tetramethylpiperidine
21) di(2,2,6,6-tetramethylpiperidin-4-yl) diethylmalonate
22) di(1,2,2,6,6-pentamethylpiperidin-4-yl) dibutylmalonate
23) di(1,2,2,6,6-pentamethylpiperidin-4-yl) butyl(3,5-di-tert-butyl-4-hydroxybenzyl) malonate
24) di(l-octyloxy-2,2,6,6-tetramethylpiperidin-4-yl) sebacate
25) di(l-cyclohexyloxy-2,2,6,6-tetramethylpiperidin-4-yl) sebacate
26) hexane- 1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) dimethylbis(2,2,6,6-tetramethylpiperidin-4-oxy)silane
29) phenyltris(2,2,6,6-tetramethylpiperidin-4-oxy)silane
30) tris(l-propyl-2,2,6,6-tetramethylpiperidin-4-yl) phosphite
31) tris(l-propyl-2,2,6,6-tetramethylpiperidin-4-yl) phosphate
32) bis(1,2,2,6,6-pentamethylpiperidin-4-yl) phenylphosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine (b) compounds of the formula (V)

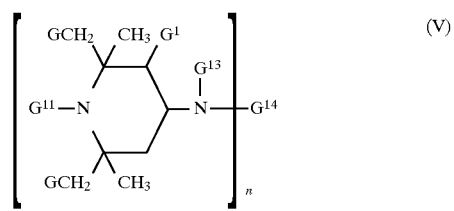

in which n is 1 or 2, G, $G^1$ and $G^{11}$ are as defined under (a),
$G^{13}$ is hydrogen, $C_1$–$C_{12}$alkyl, $C_2$–$C_5$hydroxyalkyl, $C_5$–$C_7$cycloalkyl, $C_7$–$C_8$aralkyl,
$C_2$–$C_{18}$alkanoyl, $C_3$–$C_5$alkenoyl, benzoyl or a group of the formula

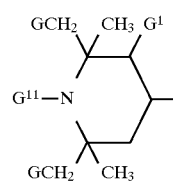

and
$G^{14}$, in the case where n is 1, is hydrogen, $C_1$–$C_{18}$alkyl, $C_3$–$C_8$alkenyl, $C_5$–$C_7$cycloalkyl,
$C_1$–$C_4$alkyl which is substituted by a hydroxyl, cyano, alkoxycarbonyl or carbamide group, or is glycidyl, a group of the formula —$CH_2$—CH(OH)—Z or of the formula —CONH—Z, in which Z is hydrogen, methyl or phenyl;
$G^{14}$, in the case where n is 2, is $C_2$–$C_{12}$alkylene, $C_6$–$C_{12}$arylene, xylylene, a —$CH_2$—CH(OH)—$CH_2$— group or a group —$CH_2$—CH(OH)—$CH_2$—O—D—O—, in which D is $C_2$–$C_{10}$alkylene, $C_6$–$C_{15}$arylene, $C_6$–$C_{12}$cycloalkylene, or, provided $G^{13}$ is not alkanoyl, alkenoyl or benzoyl, $G^{14}$ can also be 1-oxo-$C_2$–$C_{12}$alkylene, a divalent radical of an aliphatic, cycloaliphatic or aromatic dicarboxylic acid or dicarbamic acid or also the group —CO—, or,
in the case where n is 1, $G^{13}$ and $G^{14}$ together can also be the divalent radical of an aliphatic, cycloaliphatic or aromatic 1,2- or 1,3-dicarboxylic acid.

Any $C_1$–$C_{12}$alkyl or $C_1$–$C_{18}$alkyl substituents present are already as defined under (a).

Any $C_5$–$C_7$cycloalkyl substitutents present are in particular cyclohexyl.

$G^{13}$ as $C_7$–$C_8$aralkyl is in particular phenylethyl or especially benzyl. $G^{13}$ as $C_2$–$C_5$hydroxyalkyl is in particular 2-hydroxyethyl or 2-hydroxypropyl.

Examples of $G^{13}$ as $C_2$–$C_{18}$alkanoyl are propionyl, butyryl, octanoyl, dodecanoyl, hexadecanoyl, octadecanoyl, but preferably acetyl and, as $C_3$–$C_5$alkenoyl, in particular acryloyl.

Examples of $G^{14}$ as $C_2$–$C_8$alkenyl are allyl, methallyl, 2-butenyl, 2-pentenyl, 2-hexenyl or 2-octenyl.

Examples of $G^{14}$ as $C_1$–$C_4$allyl substituted by a hydroxyl, cyano, alkoxycarbonyl or carbamide group can be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene substituents present are, for example, ethylene, propylene, 2,2-dimethylpropylene, tetramethylene, hexamethylene, octamethylene, decamethylene or dodecamethylene.

Any $C_6$–$C_{15}$arylene substituents present are, for example, o-, m- or p-phenylene, 1,4-naphthylene or 4,4'-diphenylene.

A $C_6$–$C_{12}$cycloalkylene is in particular cyclohexylene.

Preference is given to compounds of the formula V in which n is 1 or 2, G is hydrogen, $G^{11}$ is hydrogen or methyl, $G^{13}$ is hydrogen, $C_1$–$C_{12}$alkyl or a group of the formula

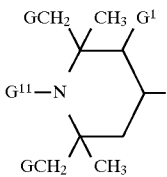

and $G^{14}$, in the case where n is 1, is hydrogen or $C_1$–$C_{12}$alkyl, and, in the case where n is 2, is $C_2$–$C_8$alkylene or 1-oxo-$C_2$–C8alkylene.

Examples of polyalkylpiperidine compounds of this class are the following compounds:

37) N,N'-bis(2,2,6,6-tetramethylpiperidin-4-yl)hexamethylene-1,6-diamine
38) N,N'-bis(2,2,6,6-tetramethylpiperidin-4-yl)hexamethylene-1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylendiamine
44) N,N'-bis(2,2,6,6-tetramethylpiperidin-4-yl)succinediamide
45) di(2,2,6,6-tetramethylpiperidin-4-yl) N-(2,2,6,6-tetramethylpiperidin-4-yl)-β-aminodipropionate
46) the compound of the formula

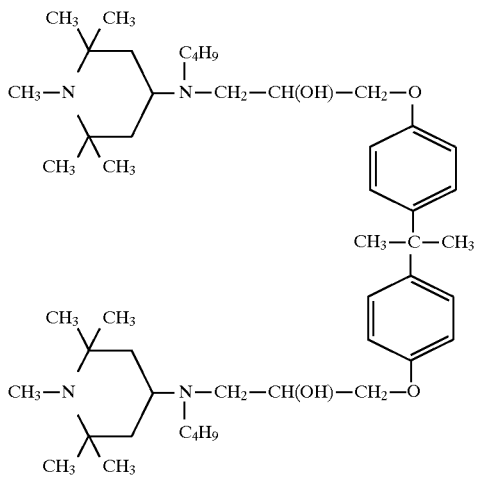

47) 4-[bis(2-hydroxyethyl)amino]-1,2,2,6,6-pentamethylpiperidine
48) 4-(3-methyl-4-hydroxy-5-tert-butylbenzamido)-2,2,6,6-tetramethylpiperidine
49) 4-methacrylamido-1,2,2,6,6-pentamethylpiperidine (c) compounds of the formula (VI)

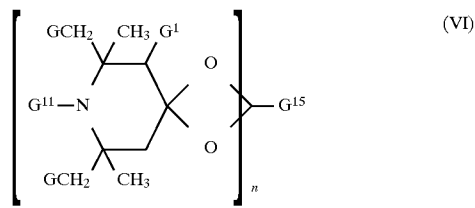

in which n is 1 or 2, G, $G^1$ and $G^{11}$ are as defined under (a), and $G^{15}$, in the case where n is 1, is $C_2$–$C_8$alkylene or -hydroxyalkylene or $C_4$–$C_{22}$acyloxyalkylene, and, in the case where n is 2, the group (—$CH_2$)$_2$C($CH_2$—)$_2$.

Examples of $G^{15}$ as $C_2$–$C_8$alkylene or -hydroxyalkylene are ethylene, 1-methylethylene, propylene, 2-ethylpropylene or 2-ethyl-2-hydroxymethylpropylene.

An example of $G^{15}$ as $C_4$–$C_{22}$acyloxyalkylene is 2-ethyl-2-acetoxymethylpropylene.

Examples of polyalkylpiperidine compounds of this class are the following compounds:

50) 9-aza-8,8,10, 10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro[5.5]-undecane
55) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

(d) Compounds of the formulae VIIA, VIIB and VIIC, compounds of the formula VIIC being preferred,

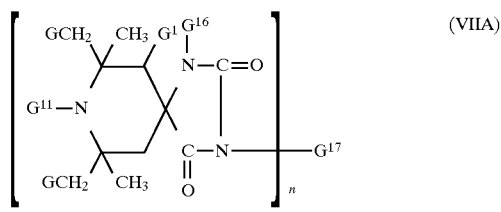

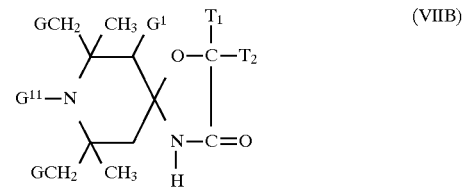

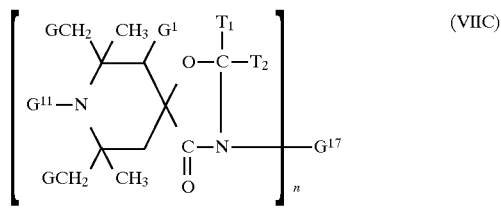

in which n is 1 or 2, G, $G^1$ and $G^{11}$ are as defined under (a), $G^{16}$ is hydrogen, $C_1$–$C_{12}$alkyl, allyl, benzyl, glycidyl or $C_2$–$C_6$alkoxyalkyl and
$G^{17}$, in the case where n is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —($CH_2$)p—COO—Q or of the formula —($CH_2$)p—O—CO—Q, in which p is 1 or 2 and Q is $C_1$–$C_4$alkyl or phenyl, $G^{17}$, in the case where n is 2, is $C_2$–$C_{12}$alkylene, $C_4$–$C_{12}$alkenylene, $C_6$–$C_{12}$ arylene, a group —$CH_2$—CH(OH)—$CH_2$—O—D—O—$CH_2$—CH(OH)—$CH_2$—, in which D is $C_2$–$C_{10}$alkylene, $C_6$–$C_{15}$arylene, $C_6$–$C_{12}$ cycloalkylene, or a group —$CH_2CH(OZ')CH_2$—(OCH$_2$—CH(OZ')CH2)$_2$—, in which Z' is hydrogen, $C_1$–Cl$_8$alkyl, allyl, benzyl, $C_2$–$C_{12}$alkanoyl or benzoyl, $T_1$ and $T_2$, independently of one another, are hydrogen, $C_1$–$C_{18}$alkyl or $C_6$–$C_{10}$aryl or $C_7$–$C_9$aralkyl, each of which is unsubstituted or substituted by halogen or $C_1$–$C_4$alkyl, or $T_1$ and $T_2$ together with the C atom linking them form a $C_5$–$C_{14}$cycloalkane ring.

Any $C_1$–$C_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents present can be, for example, the groups listed above and in addition, for example, n-tridecyl, n-tetradecyl, n-hexadecyl or n-octadecyl.

Any $C_2$–$C_6$alkoxyalkyl substituents present are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Examples of $G^{17}$ as $C_3$–$C_5$alkenyl are 1-propenyl, allyl, methallyl, 2-butenyl or 2-pentenyl.

$G^{17}$, $T_1$ and $T_2$ as $C_7$–$C_9$aralkyl are in particular phenethyl or especially benzyl. A cycloalkane ring formed by $T_1$ and $T_2$ together with the C atom can be, for example, a cyclopentane, cyclohexane, cyclooctane or cyclododecane ring.

Examples of $G^{17}$ as $C_2$–$C_4$hydroxyalkyl are 2-hydroxyethyl, 2-hydroxypropyl, 2-hydroxybutyl or 4-hydroxybutyl.

$G^{17}$, $T_1$ and $T_2$ as $C_6$–$C_{10}$aryl are in particular phenyl, α- or β-naphthyl, each of which is unsubstituted or substituted by halogen or $C_1$–$C_4$alkyl.

Examples of $G^{17}$ as $C_2$–$C_{12}$alkylene are ethylene, propylene, 2,2-dimethylpropylene, tetramethylene, hexamethylene, octamethylene, decamethylene or dodecamethylene.

$G^{17}$ as $C_4$–$C_{12}$alkenylene is in particular 2-butenylene, 2-pentenylene or 3-hexenylene.

Examples of $G^{17}$ as $C_6$–$C_{12}$arylene are o-, m- or p-phenylene, 1,4-naphthylene or 4,4'-diphenylene.

Examples of Z' as $C_2$–$C_{12}$alkanoyl are propionyl, butyryl, octanoyl, dodecanoyl, but preferably acetyl.

D as $C_2$–$C_{10}$alkylene, $C_6$–$C_{15}$arylene or $C_6$–$C_{12}$cycloalkylene is as defined under (b).

Examples of polyalkylpiperidine compounds of this class are the following compounds:
56) 3-benzyl-1,3,8-triaza-7,7,9,9-tetramethylspiro[4.5]decane-2,4- dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro-[4.5]decane
62) 2,2-dibutyl-7,7,9,9-tetramethyl-l-oxa-3,8-diaza-4-oxospiro-[4.5]decane
63) 2,2,4,4-tetramethyl-7-oxa-3,20-diaza-21-oxodispiro[5.1.11.2]heneicosane
64) 2-butyl-7,7,9,9-tetramethyl-l-oxa-4,8-diaza-3-oxospiro[4.5]decane and preferably:
65) 8-acetyl-3-dodecyl-1,3,8-triaza-7,7,9,9-tetramethylspiro[4.5]decane-2,4-dione or the compounds of the following formulae:

66) 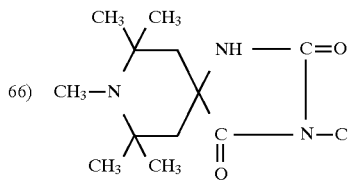 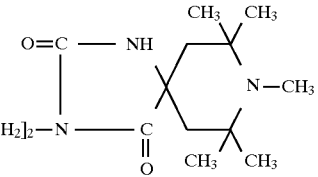

67) 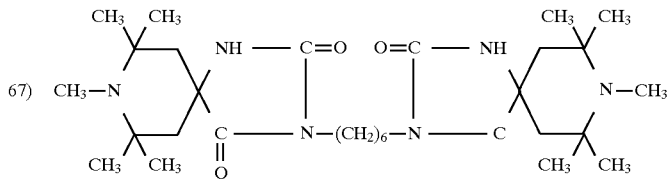

68) 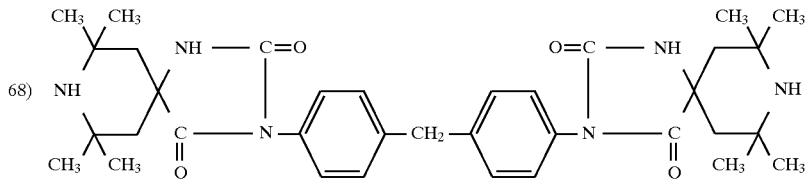

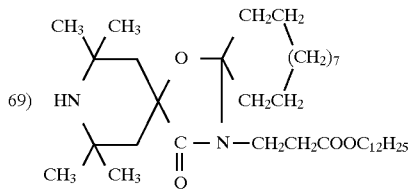

69)

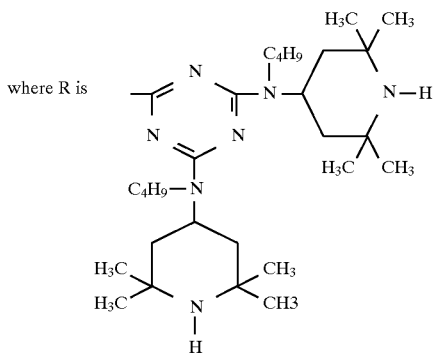

where R is (e) compounds of the formula VIII, which on their part are preferred,

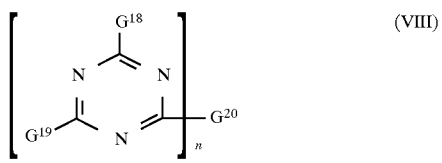

in which n is 1 or 2 and $G^{18}$ is a group of one of the formulae

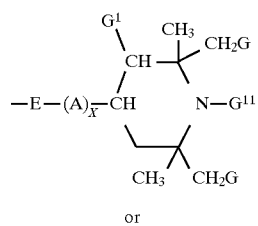

or

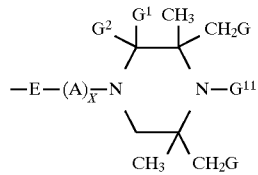

in which G and $G^{11}$ are as defined under (a) and $G^1$ and $G^2$ are hydrogen, methyl or together are a substituent =O,
E is —O— or —$NG^{13}$—,
A is $C_2$–$C_6$allylene or —$(CH_2)_3$—O— and
x is 0 or 1,
$G^{13}$ is hydrogen, $C_1$–$C_{12}$alkyl, $C_2$–$C_5$hydroxyalkyl or $C_5$–$C_7$cycloalkyl,
$G^{19}$ is identical to $G^{18}$ or one of the groups —$NG^{21}G^{22}$, —$OG^{23}$, —$NHCH_2OG^{23}$ or —$N(CH_2OG^{23})_2$,
$G^{20}$, in the case where n is 1, is identical to $G^{18}$ or $G^{19}$ and, if n is 2, is a group —E—B—E—, in which B is $C_2$–$C_8$alkylene or $C_2$–$C_8$alkylene which is interrupted by 1 or 2 groups —$N(G^{21})$—,
$G^{21}$ is $C_1$–$C_{12}$alkyl, cyclohexyl, benzyl or $C_1$–$C_4$hydroxyalkyl or a group of the formula

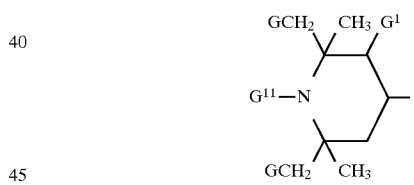

$G^{22}$ is $C_1$–$C_{12}$alkyl, cyclohexyl, benzyl, $C_1$–$C_4$hydroxyalkyl, and
$G^{23}$ is hydrogen, $C_1$–$C_{12}$alkyl or phenyl, or
$G^{21}$ and $G^{22}$ together are $C_4$–$C_5$alkylene or -oxaalkylene, for example

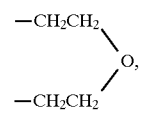

or a group of the formula or

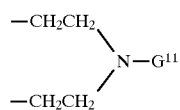

$G^{21}$ is a group of the formula

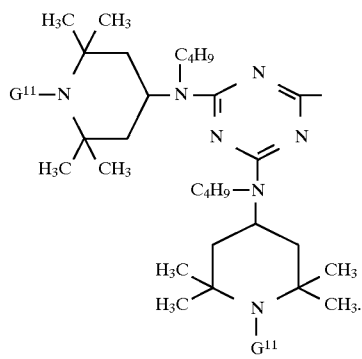

Any $C_1$–$C_{12}$alkyl substituents present are, for example, methyl, ethyl, n-propyl, n-butyl, sec-butyl, tert-butyl, n-hexyl, n-octyl, 2-ethylhexyl, n-nonyl,-n-decyl, n-undecyl or n-dodecyl.

Any $C_1$–$C_4$hydroxyalkyl substituents present are, for example, 2-hydroxyethyl, 2-hydroxypropyl, 3-hydroxypropyl, 2-hydroxybutyl or 4-hydroxybutyl.

Examples of A as $C_2$–$C_6$alkylene are ethylene, propylene, 2,2-dimethylpropylene, tetramethylene or hexamethylene.

Examples of $G^{21}$ and $G^{22}$ together as $C_4$–$C_5$alkylene or -oxaalkylene are tetramethylene, pentamethylene or 3-oxapentamethylene.

Examples of polyalkylpiperidine compounds of this class are the compounds of the following formulae:

70)

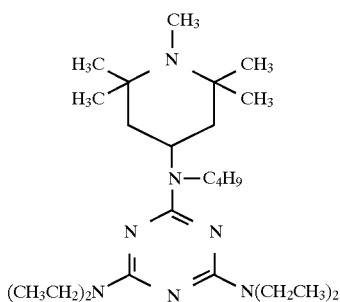

71)

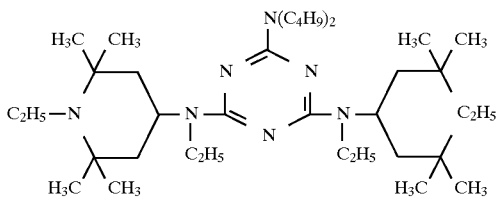

72)

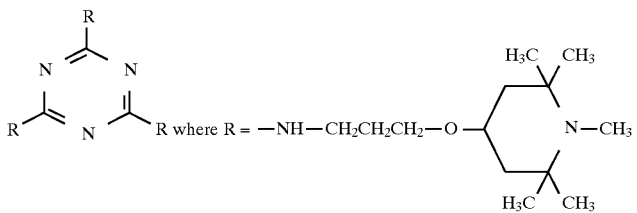

73)
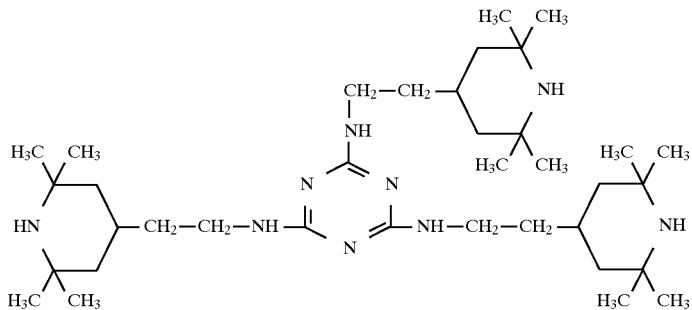
74)
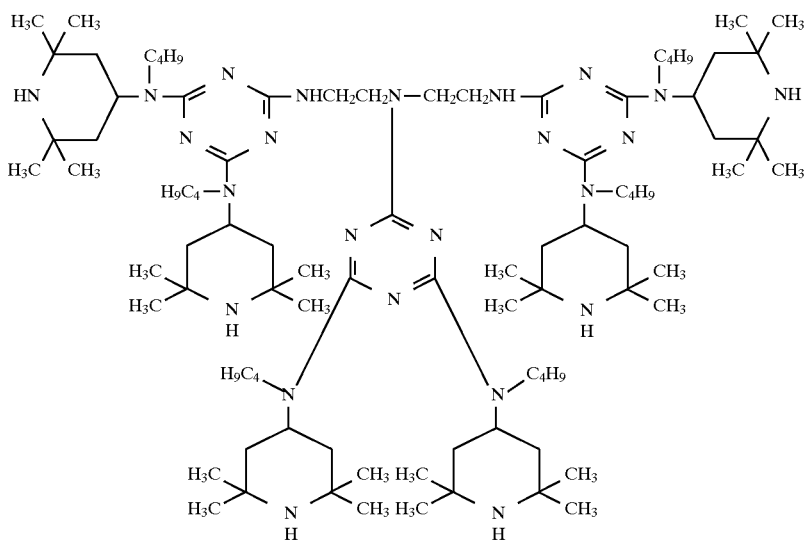
75) 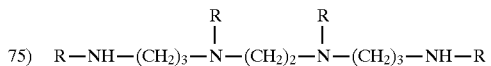
where R is 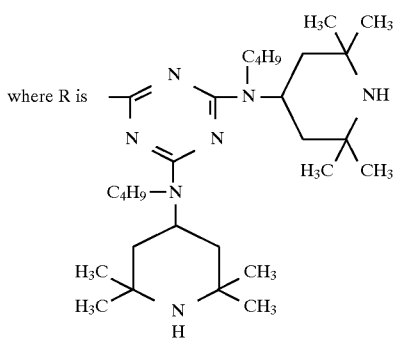
76) 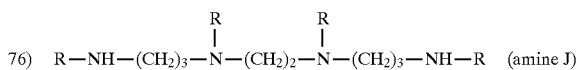  (amine J)

where R is 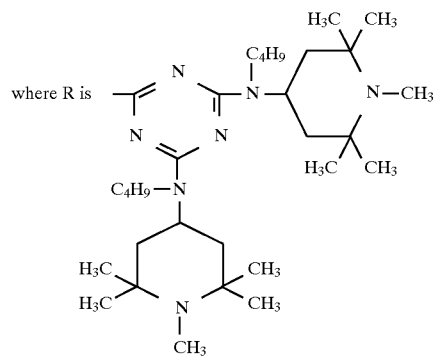
77) 
where R is 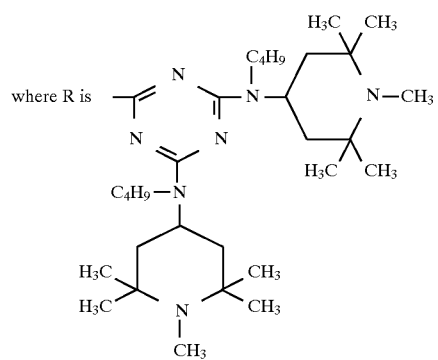
78) 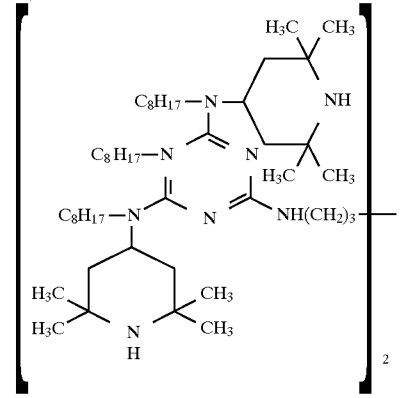
79) 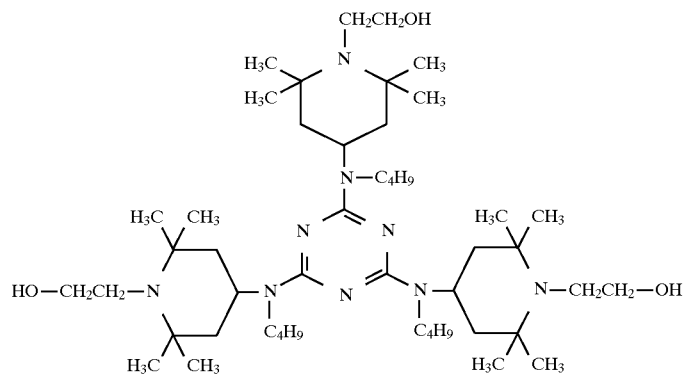

(80)

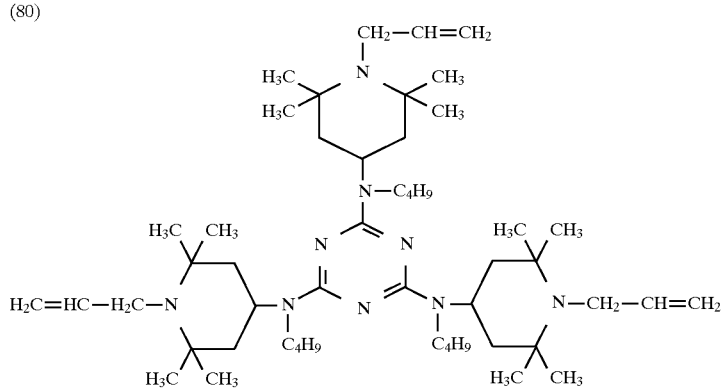

(f) oligomer or polymer compounds whose recurring structural unit contains a 2,2,6,6-tetraalkylpiperidine radical of the formula II, in particular polyesters, polyethers, polyamides, polyamines, polyurethanes, polyureas, polyaminotriazines, poly(meth)acrylates, poly(meth)acrylamides and copolymers thereof containing such radicals.

Examples of 2,2,6,6-polyalkylpiperidine light stabilizers of this class are the compounds of the following formulae, m being a number from 2 to about 200.

(81)

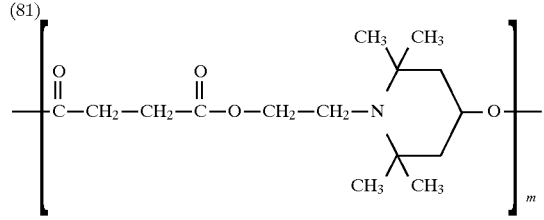

82)

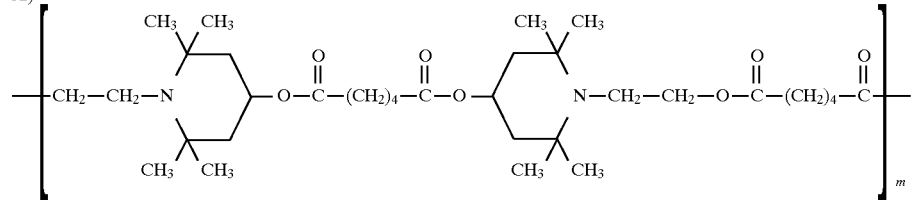

83)

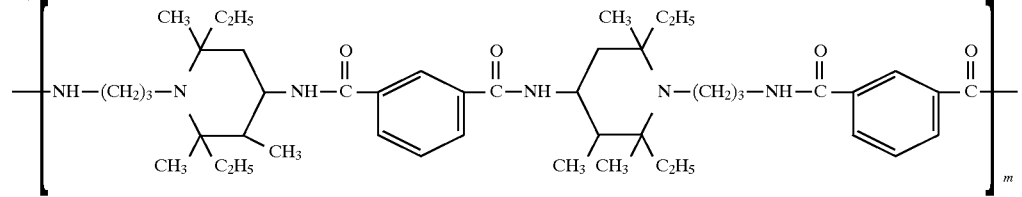

(84)

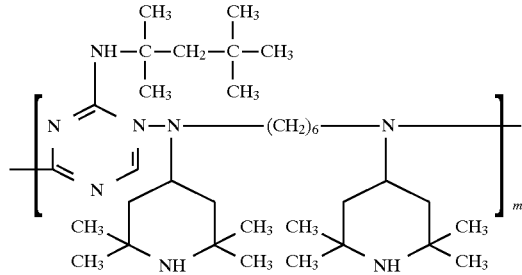

(85)
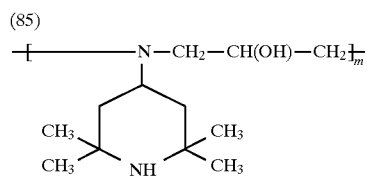
(86)
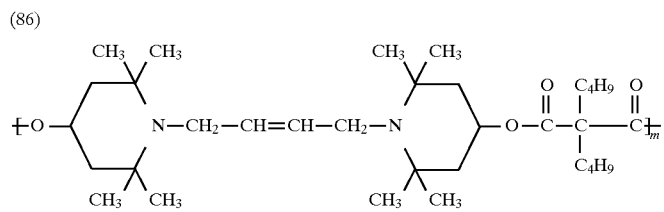
(87)
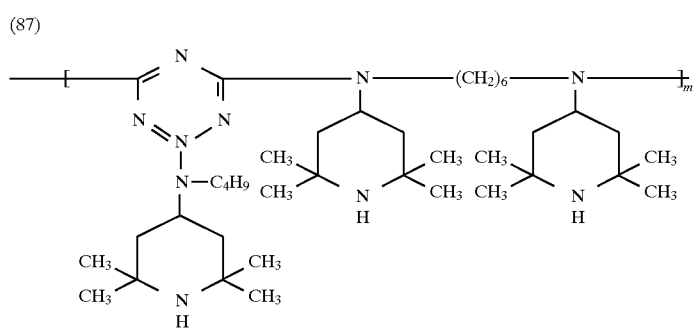
(88)
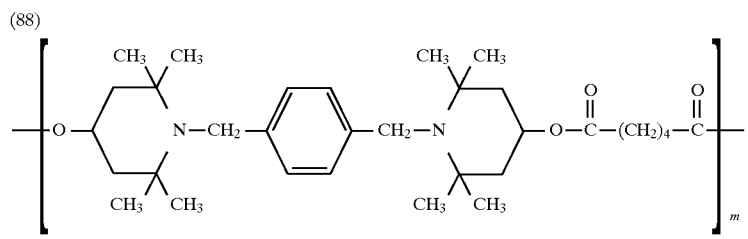
(89)
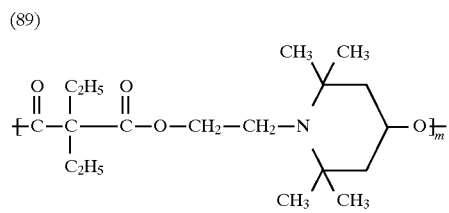
(90)
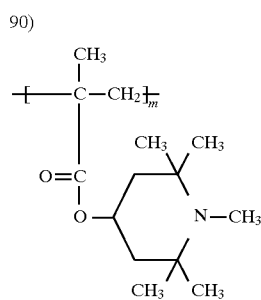

91) 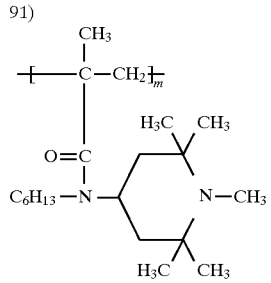
92) 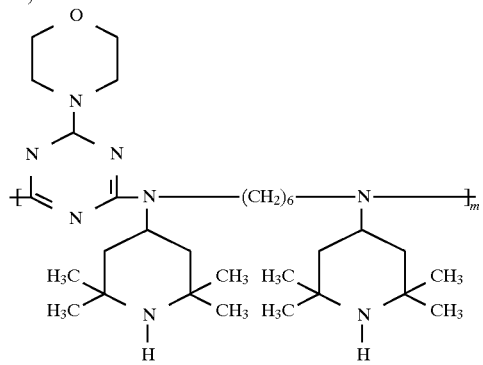
93) 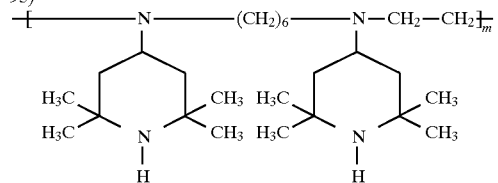
94) 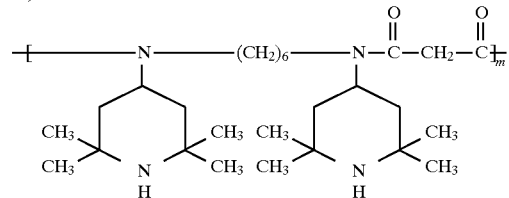
95) 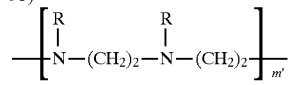
where R is 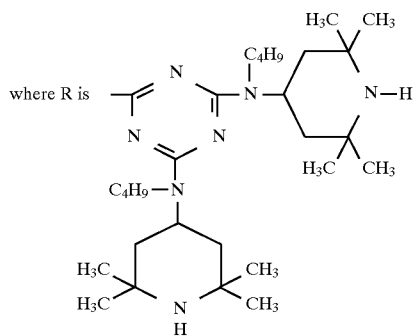

or a branching of the chain

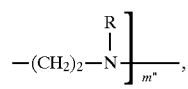

m' and m" are each an integer from the range 0–200, on condition that m'+m" is m.

Further examples of polymer light stabilizers are reaction products of the formula

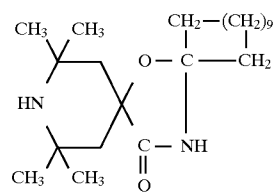

with epichlorohydrin;

polyesters obtained from butane-1,2,3,4-tetracarboxylic acid with a bifunctional alcohol of the formula

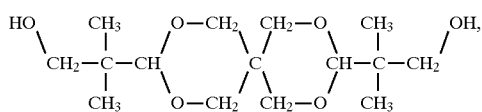

whose carboxyl side chains originating from the tetracarboxylic acid have been esterified with 2,2,6,6-tetramethyl-4-hydroxypiperidine;

compounds of the formula

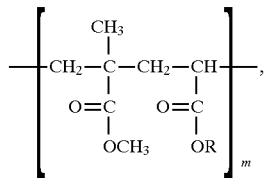

about one third of the radicals R being —$C_2H_5$ and the others being

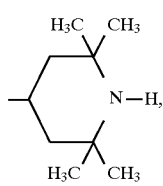

and m being a number from the range 2 to 200; or copolymers whose recurring unit consists of 2 units

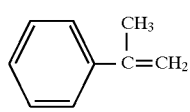

and 1 unit each of

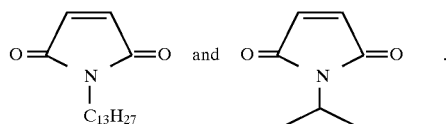

(g) compounds of the formula IX

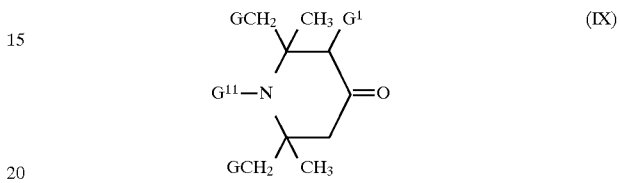

(IX)

in which G, $G^1$ and $G^{11}$ are as defined under (a).

Preference is given to compounds of the formula IX in which G is hydrogen or methyl and $G^{11}$ is hydrogen or methyl.

Examples of such compounds are:

96) 2,2,6,6-tetramethyl-4-piperidone (triacetoneamine)
97) 1,2,2,6,6-pentamethyl-4-piperidone
98) 2,2,6,6-tetramethyl-4-piperidone 1-oxide
99) 2,3,6-trimethyl-2,6-diethyl-4-piperidone (h) compounds of the formula X

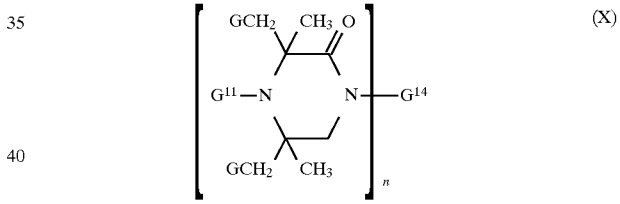

(X)

in which n is 1 or 2 and in which G and $G^{11}$ are as defined under (a) and $G^{14}$ is as defined under (b), the meanings —CONH—Z and —$CH_2$—CH(OH)—$CH_2$—O—D—O— being excepted for $G^{14}$.

Examples of such compounds are:

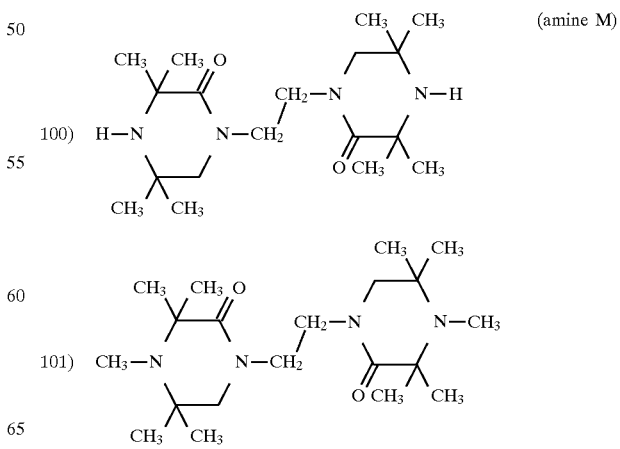

102) 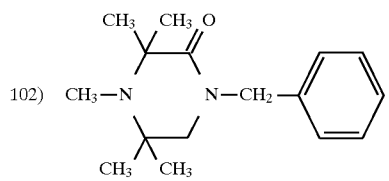

Particular preference for use in the process according to the invention is given to the following amines:

Compounds of the formula IV in which n is an integer from the range 1 to 4, G and $G^1$ are hydrogen, and $G^{11}$ is hydrogen or $C_1$–$C_{18}$alkyl, and $G^{12}$, in the case where n is 1, is a radical of the formula —$(C_jH_{2j})$—$Si(Z')_2Z''$, in which j is an integer from the range 2 to 5 and Z' and Z'', independently of one another, are $C_1$–$C_4$alkyl or $C_1$–$C_4$alkoxy, and $G^{12}$, in the case where n is 2, is a radical of an aliphatic dicarboxylic acid having 2 to 12 C atoms which may be substituted by —$COOZ^{12}$, $Z^{12}$ being $C_1$–$C_{20}$alkyl, $G^{12}$, in the case where n is 3, is a radical of an aromatic tricarboxylic acid having 9 to 15 C atoms, $G^{12}$, in the case where n is 4, is a radical of an aliphatic tetracarboxylic acid having 8 to 12 C atoms; amines from this class which are of particular technical interest are those of the formulae (amine B)
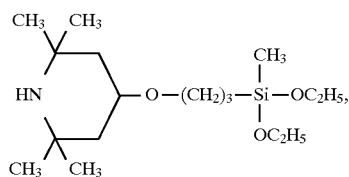

(amine C)
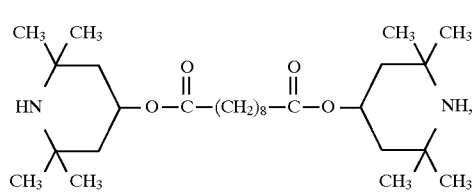

(amine D)
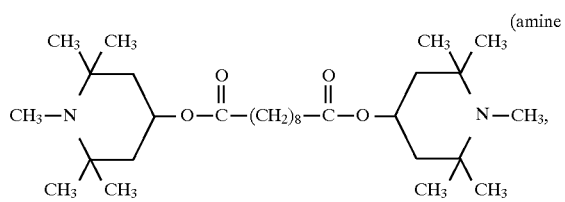

(amine E)
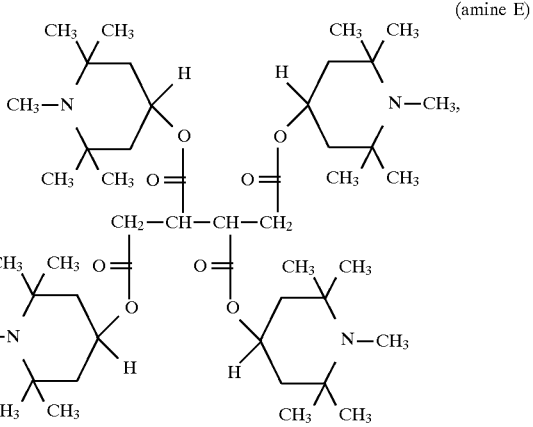

and
esters of butane-1,2,3,4-tetracarboxylic acid containing 2 units each of 1,2,2,6,6-pentamethyl-4-hydroxy-piperidine and $C_{13}H_{27}$—OH (amine F);

compounds of the formula V in which n is 2, G and $G^1$ are hydrogen, $G^{11}$ is hydrogen or methyl and $G^{13}$ is hydrogen or $C_1$–$C_8$alkyl, and $G^{14}$ is $C_2$–$C_8$alkylene or 1-oxo-$C_2$–$C_8$alkylene; an amine from this class which is of particular technical interest is the compound of the formula (amine G)
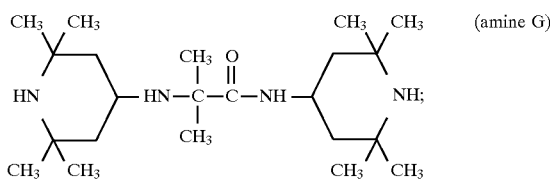

compounds of the formula VIIC in which n is 1, G, $G^1$ and $G^{17}$ are hydrogen, $G^{11}$ is hydrogen or methyl and $T_1$ and $T_2$ together with the C atom linking them form a $C_5$–$C_{14}$cycloalkane ring; an amine from this class which is of particular technical interest is the compound of the formula (amine H)
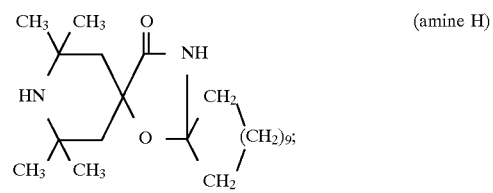

compounds of the formula VIII in which n is 1 or 2, $G^{18}$ and $G^{19}$ are a group of one of the formulae

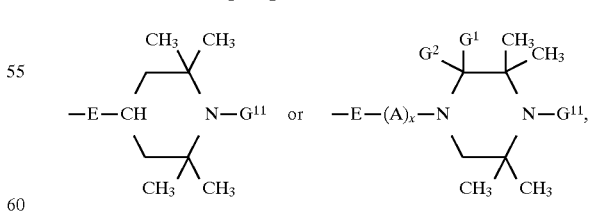

$G^{11}$ is hydrogen or methyl, $G^1$ and $G^2$ are hydrogen or together are a substituent =O, E is —O— or —NG$^{13}$—, A is $C_2$–$C_6$alkylene, and x is 0 or 1, $G^{13}$ is hydrogen, $C_1$–$C_{12}$alkyl or cyclohexyl, $G^{20}$, in the case where n is 1, is identical to $G^{18}$ and, in the case where n is 2, is a group —E—B—E—, in which B is $C_2$–$C_8$alkylene or $C_2$–$C_8$alkylene which is interrupted by 1 or 2 groups —N($G^{21}$)—, $G^{21}$ is $C_1$–$C_{12}$alkyl, cyclohexyl, benzyl or $C_1$–$C_4$hydroxyalkyl or a group of the formula

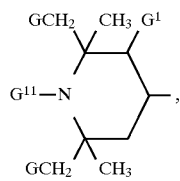

or $G^{21}$ is a group of the formula

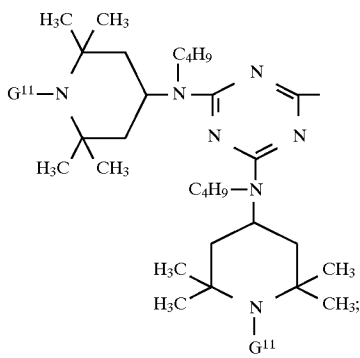

amines from this class which are of particular technical interest are the compound (76) [=amine J] described above and the compounds of the formulae

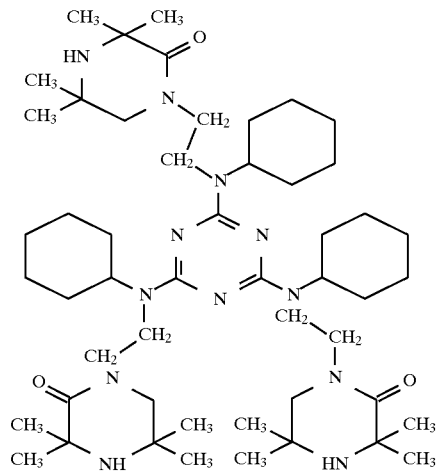

(amines K and L);

and

-continued

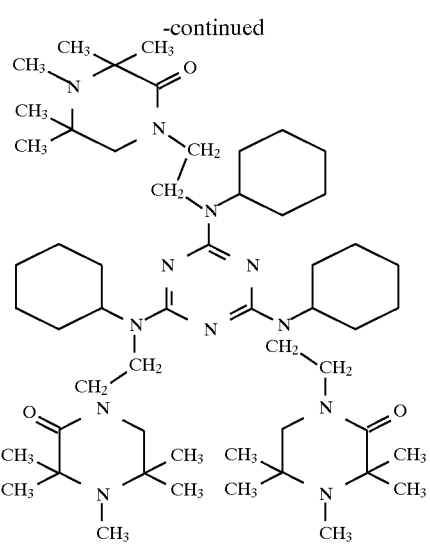

compounds of the formula X in which n is 2, $G^{11}$ is hydrogen or methyl and $G^{14}$ is $C_2$–$C_{12}$alkylene;

an amine from this class which is of particular technical interest is the compound (100) [=amine M] described above; and oligomer compounds having 2 to 10 recurring units, such as are obtainable by reaction (i) of 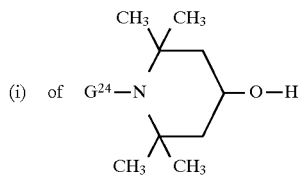

in which $G^{24}$ is $C_2$–$C_5$hydroxyalkyl with an aliphatic $C_2$–$C_{12}$dicarboxylic acid or a suitable reactive- derivative, such as the diester, dichloride or anhydride;

(j) of a linear oligomer polyester obtained from a dialcohol and butane-1,2,3,4-tetracarboxylic acid with 2,2,6,6-tetramethyl4-hydroxypiperidine;

(k) of 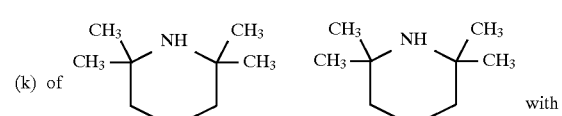 with

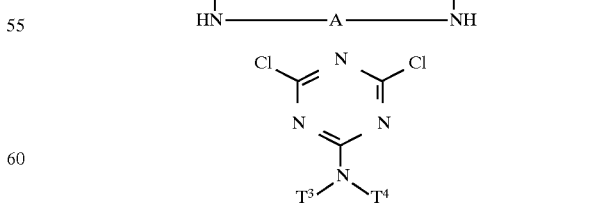

in which A is $C_2$–$C_6$alkyl, $T^3$ is $C_1$–$C_{18}$alkyl or cyclohexyl, $T^4$ is hydrogen or $C_1$–$C_{18}$alkyl, or $T^3$ and $T^4$ together are $C_4$–$C_6$alkylene or $C_3$–$C_5$oxaalkylene;

(1) of H$_2$N—A—NH—A—NH$_2$ with

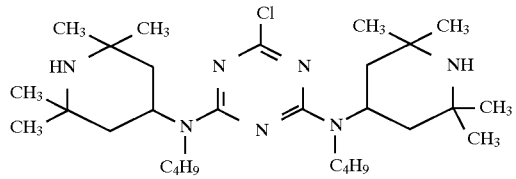

and

Br—A—Br in which A is C$_2$-C$_6$alkylene;
(m) of compounds of the formula

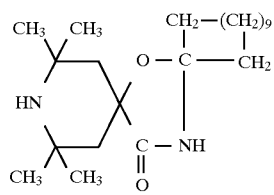

with epichlorohydrin;

(n) of 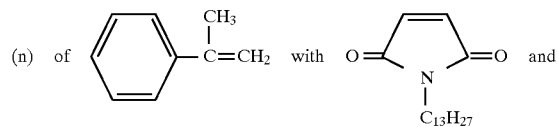

-continued

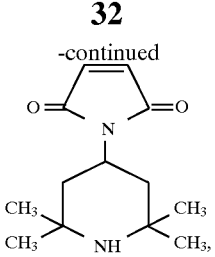

and those of the formula (o) 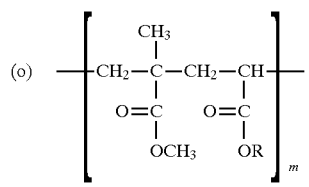

in which about one third of the radicals R is —C$_2$H$_5$ and the others are

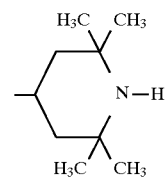

and m is a number from the range 2 to 10;

of these, oligomer amines of particular technical interest are those of the formulae (m again is a number from the range 2 to 10)

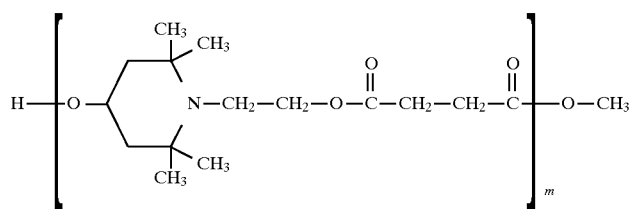

(amine N);

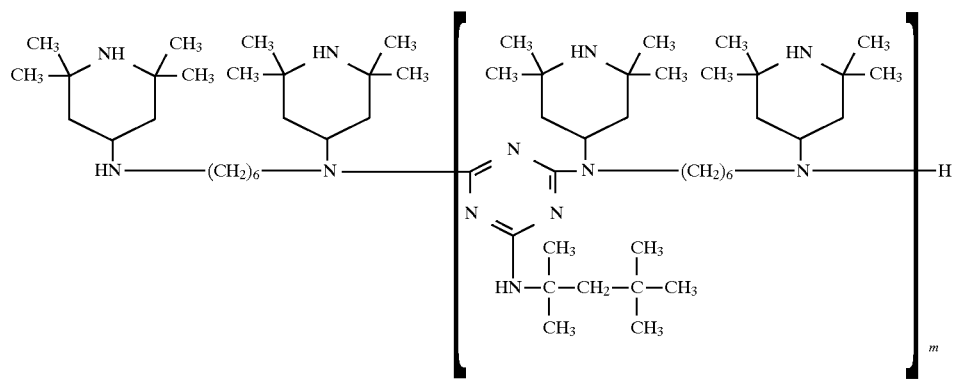

(amine P);

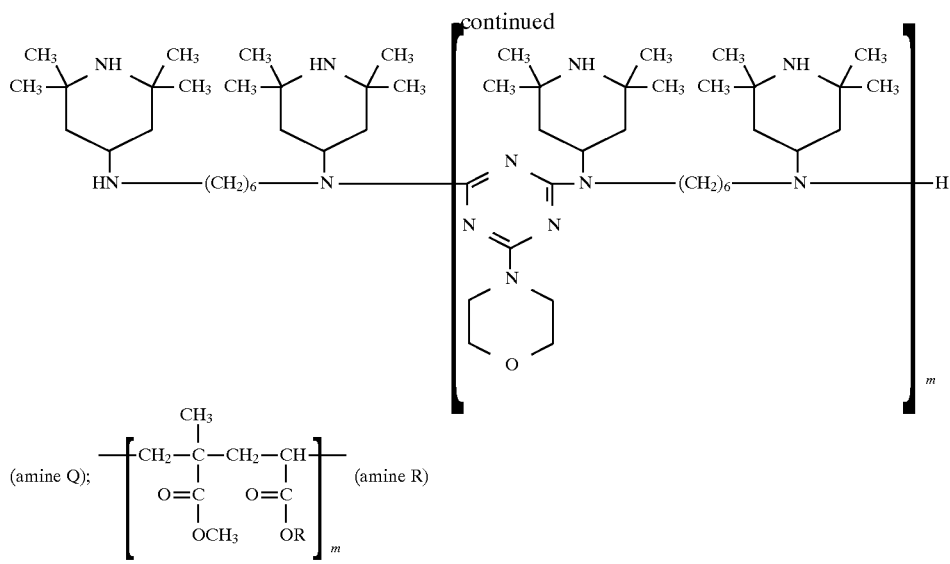

(amine Q); 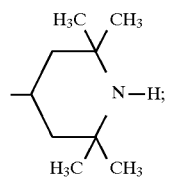 (amine R)

in which about one third of the radicals R is —$C_2H_5$ and the others are

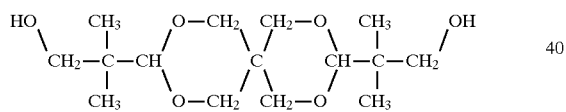

a linear polyester hang 2 to 10 recurring units obtained from butane-1,2,3,4-tetracarboxylic acid and a dialcohol of the formula in which the end groups and side chains are formed by esterification of the free carboxyl groups with 2,2,6,6-tetramethyl-4-hydroxypiperidine (amine S); a copolymer whose recurring unit is composed of 2 units

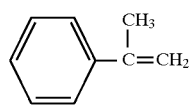

and 1 unit each of

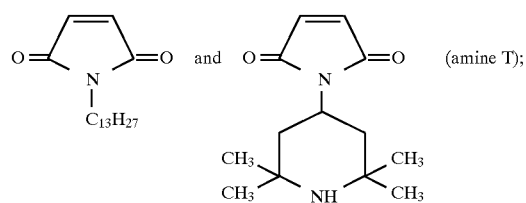

the reaction product of $H_2N$—$(CH_2)_2$—$NH$—$(CH_2)_2$—$NH_2$ with

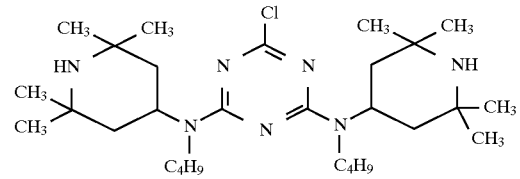

and Br—$(CH_2)_2$—Br (amine U);

and the reaction product of the compound of the formula

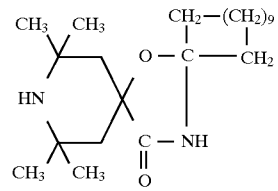

with epichlorohydrin (amine W).

The oligomer amines are often mixtures of compounds which differ from one another with respect to their chain length.

In the process according to the invention, in particular the addition of those sterically hindered amines is preferred whose molecular weight or average molecular weight is in the range 300 to 10,000, in particular in the range 1000 to 10,000. Of these, those sterically hindered amines whose molecular weight or average molecular weight is in the range 1500 to 10,000, for example in the range 2000 to 7500 may again be mentioned in particular.

Amines which are particularly highly suitable for use in the process according to the invention are the compounds of the formulae

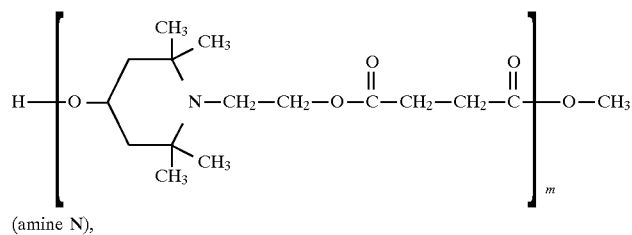
(amine N),
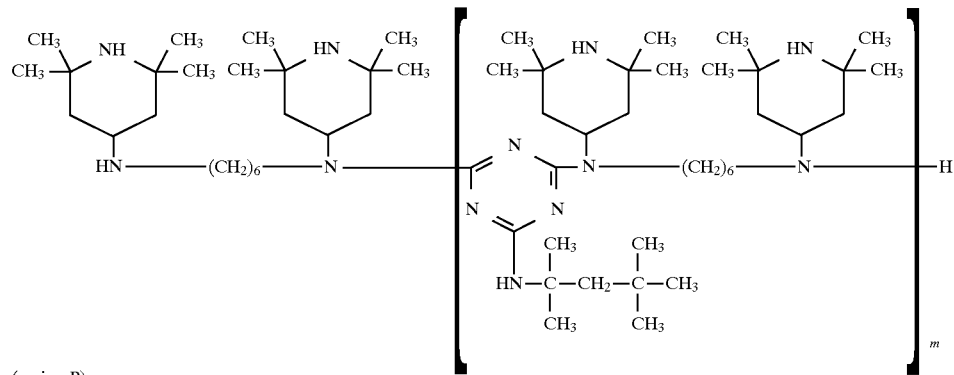
(amine P);
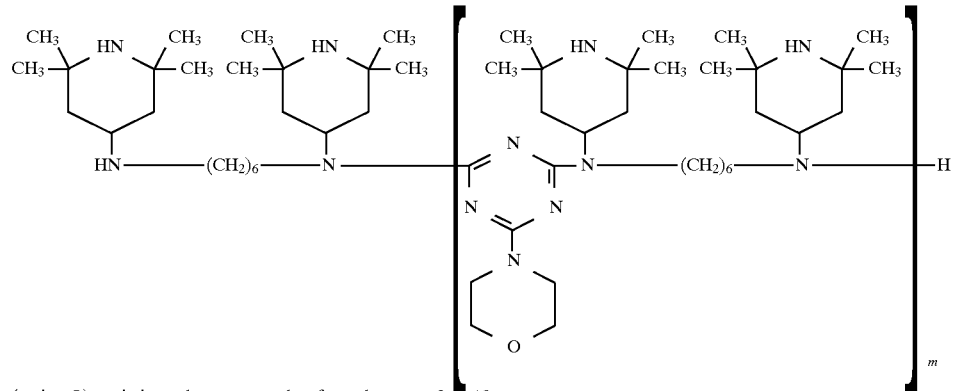
(amine Q); m is in each case a number from the range 2 to 10.
m is in each case a number from the range 2 to 10.
The sterically hindered amines mentioned are known compounds; many of them are commercially available.
In the process according to the invention phosphites or phosphonites of one of the formulae (1) to (7) are preferably stabilized,
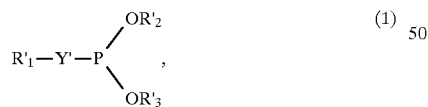
(1)
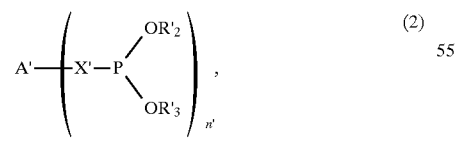
(2)
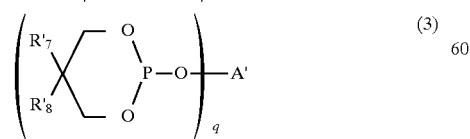
(3)
-continued
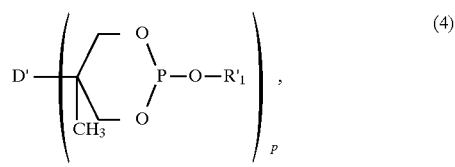
(4)
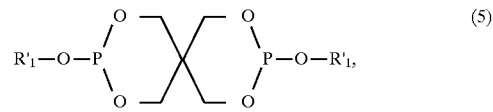
(5)

-continued

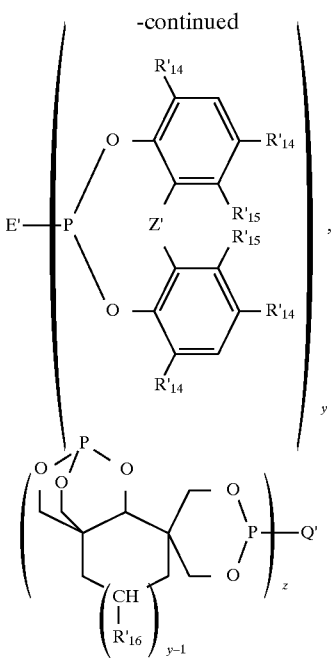

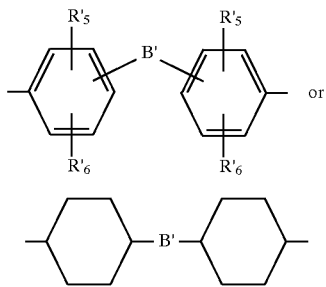

in which the indices are integers and n' is 2, 3 or 4; p is 1 or 2; q is 2 or 3; r is 4 to 12; y is 1, 2 or 3; and z is 1 or 6;

A', in the case where n' is 2, is alkylene having 2 to 18 carbon atoms; alkylene which is interrupted by —S—, —O— or —NR'$_4$— and has 2 to 12 carbon atoms; a radical of one of the formulae or phenylene;

A', in the case where n' is 3, is a radical of the formula —C$_r$H$_{2r-1}$—;

A', in the case where n' is 4, is the radical of the formula C(CH$_2$—)$_4$;

A" has the meaning of A' in the case where n' is 2;

B' is a radical of the formula —CH$_2$—; —CHR'$_4$—; —CR'$_1$R'$_4$—; —S— or a direct bond; or is C$_5$–C$_7$cycloalkylidene; or cyclohexylidene which is substituted in the 3, 4 and/or 5 position by 1 to 4 C$_1$–C$_4$alkyl radicals;

D', in the case where p is 1, is methyl and, in the case where p is 2, is —CH$_2$OCH$_2$—;

E', in the case where y is 1, is alkyl having 1 to 18 carbon atoms, a radical of the formula —OR', or halogen;

E', in the case where y is 2, is a radical of the formula —O—A"—O—;

E', in the case where y is 3, is a radical of the formula R'$_4$C(CH$_2$O—)$_3$;

Q' is the radical of an at least z-hydric alcohol or phenol, this radical being attached to the P atom(s) via the alcholic or phenolic O atom(s);

R'$_1$, R'$_2$ and R'$_3$, independently of one another, are alkyl having 1 to 30 carbon atoms;

alkyl which is substituted by halogen, —COOR'$_4$, —CN or —CONR'$_4$R$_4$' and has 1 to 18 carbon atoms; alkyl which is interrupted by —S—, —O— or —NR'$_4$, and has 2 to 18 carbon atoms; phenyl-C$_1$–C$_4$alkyl; cycloalkyl having 5 to 12 carbon atoms; phenyl or naphthyl;

phenyl or naphthyl each of which is substituted by halogen, 1 to 3 alkyl radicals or alkoxy radicals having a total of 1 to 18 carbon atoms or by phenyl-C$_1$–C$_4$alkyl; or are a radical of the formula

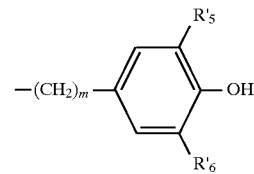

in which m is a n integer from the range 3 to 6;

R'$_4$ or the radicals R$_4$', independently of one another, are hydrogen; alkyl having 1 to 18 carbon atoms; cycloalkyl having 5 to 12 carbon atoms; or phenylalkyl having 1 to 4 carbon atoms in the alkyl moiety;

R'$_5$ and R'$_6$, independently of one another, are hydrogen; alkyl having 1 to 8 carbon atoms or cycloalkyl having 5 or 6 carbon atoms;

R'$_7$ and R'$_8$, in the case where q is 2, are, independently of one another, C$_1$–C$_4$alyl or together are a 2,3-dehydropentamethylene radical; and R'$_7$ and R'$_8$, in the case where q is 3, are methyl;

the substituents R'$_{14}$, independently of one another, are hydrogen; alkyl having 1 to 9 carbon atoms or cyclohexyl;

the substituents R'$_{15}$, independently of one another, are hydrogen or methyl; and R'$_{16}$ is hydrogen or C$_1$–C$_4$alkyl and, in the case where more than one radical R'$_{16}$ is present, the radicals R'$_{16}$ are identical or different;

X' and Y' are each a direct bond or —O—; and

Z' is a direct bond; —CH$_2$—; —C(R'$_{16}$)$_2$— or —S—.

Particular preference is given to a process in which the phosphite or phosphonite is one of the formulae (1), (2), (5) or (6), in which n' is 2 and y is 1 or 2;

A' is alkylene having 2 to 18 carbon atoms; p-phenylene or p-biphenylene;

E', in the case where y is 1, is C$_1$–C18alkyl, —OR$_1$ or fluorine; and, in the case where y is 2, is p-biphenylene;

R'$_1$, R'$_2$ and R'$_3$, independently of one another, are allyl having 1 to 18 carbon atoms;

phenyl-C$_1$–C$_4$alkyl; cyclohexyl; phenyl; phenyl which is substituted by 1 to 3 alkyl radicals having a total of 1 to 18 carbon atoms;

the substituents R'$_{14}$, independently of one another, are hydrogen or alkyl having 1 to 9 carbon atoms;

R'$_{15}$ is hydrogen or methyl;

X' is a direct bond;

Y' is —O—; and

Z' is a direct bond or —CH(R'$_{16}$)—.

Of particular technical interest is a process for stabilizing a phosphite or phosphonite of one of the formulae (1), (2), (5) or (6), in which n' is 2 and y is 1;

A' is p-biphenylene;

E' is C$_1$–C$_{18}$alkoxy or fluorine;

R'$_1$, R'$_2$ and R'$_3$, independently of one another, are alkyl having 1 to 18 carbon atoms;

phenyl substituted by 2 or 3 alkyl radicals having a total of 2 to 12 carbon atoms;

the substituents R'$_{14}$, independently of one another, are methyl or tert-butyl;

R'$_{15}$ is hydrogen;

X' is a direct bond;

Y' is —O—; and

Z' is a direct bond, —CH$_2$— or —CH(CH$_3$)—.

Particular preference is given to phosphites, in particular those of the formulae (1) and (5).

The following compounds are examples of phosphites and phosphonites whose hydrolytic stability can be improved particularly advantageously by the process according to the invention;

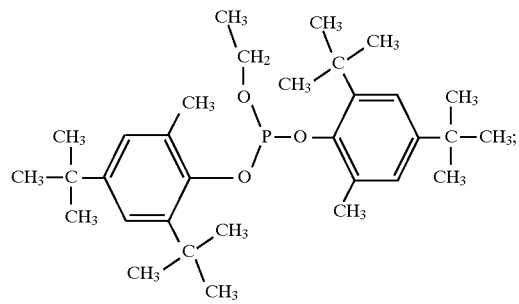
(Ph-1)

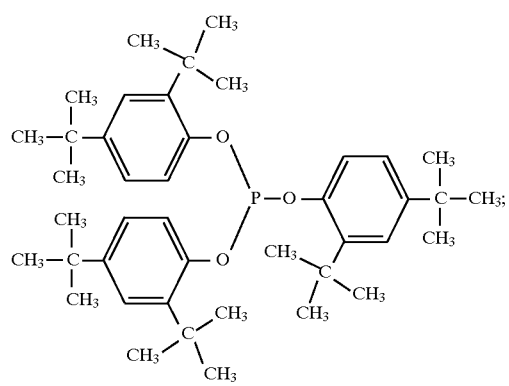
(Ph-2)

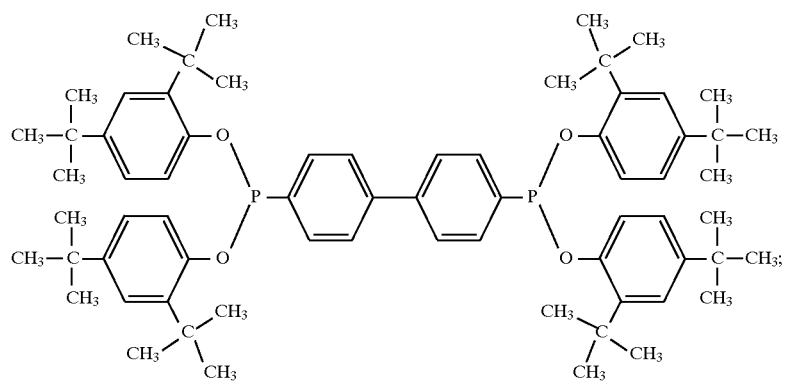
(Ph-3)

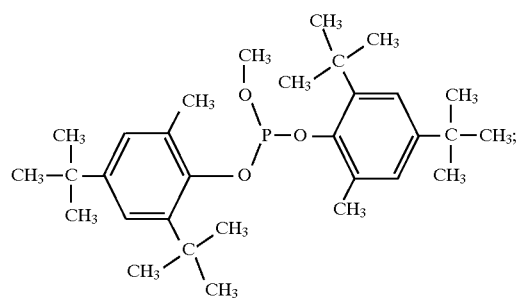
(Ph-4)

-continued
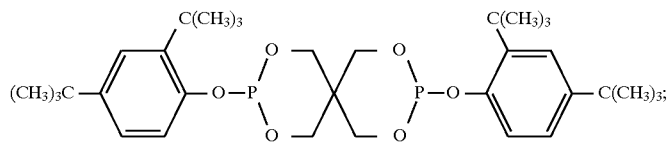 (Ph-5)
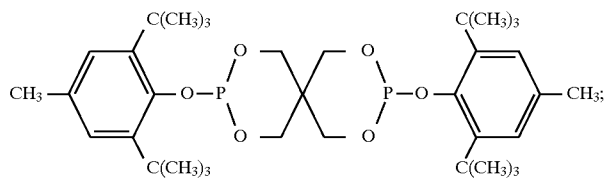 (Ph-6)
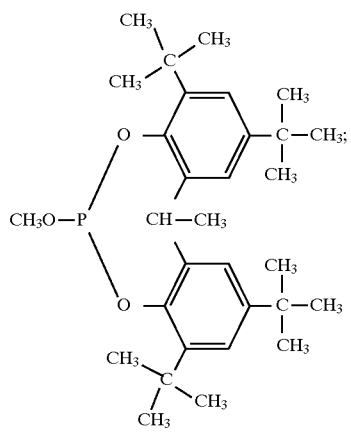 (Ph-7)
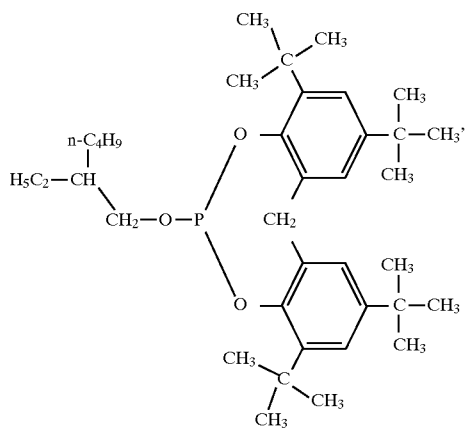 (Ph-8)
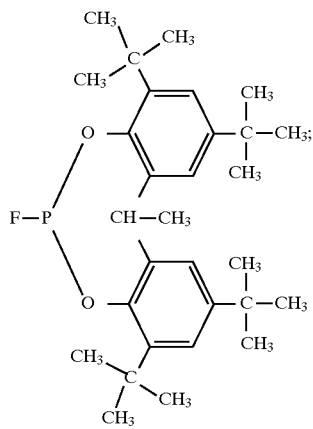 (Ph-9)

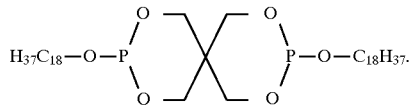

(Ph-10)

The phosphites and phosphonites mentioned are known compounds; some of them are commercially available.

Some commercial compounds are present as mixtures of compounds or in prestabilized form; in many cases, a conventioal amine is used in a concentration of about 1% as prestabilization. The hydrolytic stability of such products can also be significantly improved by means of the process according to the invention.

The products obtained from the process according to the invention can advantageously be used as stabilizers for organic material, in particular organic polymers, for example synthetic polymers, against the damaging effect of heat, oxygen and/or light. For examples of such polymers, see, for example, U.S. Pat. No. 4 855 345, column 4, line 63, up to column 7, line 54.

A composition comprising (a) 80 to 99.9% by weight of organic phosphite or phosphonite and (b) 0.1 to 20% by weight (in each case, relative to the weight of the composition) of a sterically hindered amine is also provided by the invention. Component (a) is preferably a solid at 20° C.

Preferably, the composition according to the invention contains, apart from components (a) and (b), no further main components, in particular no organic polymers having a molecular weight of greater than 5000. Particular preference is given to compositions containing, apart from components (a) and (b), no compounds whose molecular weight is greater than 2000.

In the compositions according to the invention, the sterically hindered amine is often present in an amount of 0.1 to 13% by weight, preference is given to a composition containing the sterically hindered amine in an amount of 0.1 to 7.4; in particular 0.1 to 4.8; especially in an amount of 0.2 to 24%, by weight (in each case, relative to the weight of the composition).

The phosphites and phosphonites stabilized according to the invention are notable for their excellent resistance to hydrolysis and have a long shelf life even at high atmospheric humidity.

The invention also includes a method of storing solid organic phosphites or phosphonites, which comprises admixing to the phosphites or phosphonites 0.i to 25; in general 0.1 to 15, preferably 0.1 to 8; in particular 0.1 to 5; especially 0.2 to 2.5%, by weight (relative to the phosphite or phosphonite) of a sterically hindered amine.

The examples which follow illustrate the process according to the invention. All parts or percentages given in the examples are based on the total weight of the phosphite or phosphonite used unless stated otherwise. The structural formulae of the phosphites and amines used in the examples have been listed above in the text.

Example 1: 300 g of phosphate Ph-1 are dissolved in 300 g of isopropanol at 50° C. 15 g of amine P are mixed into the solution with stirring the resulting mixture is then cooled to 10°–15° C., resulting in crystallization of phosphite together with the amine. The crystalline product is then filtered off and dried at 60° C. under reduced pressure.

Elemental analysis for the dry product gives an amine P content of 1.6% by weight (relative to the phosphite).

A sample serving as a comparison is crystallized without addition of an amine.

60 g of triisopropanolamine, a known stabilizer against hydrolysis, are added to a further comparison sample containing 300 g of Ph-1, and the mixture is crystallized as described above.

Equal portions of the product are then subjected to the following tests for resistance to hydrolysis:
a) During storage at 50° C. and 75% of atmospheric humidity, the time is measured at which upon visual inspection the initial powder starts to deliquesce (transition p-c) and the length of time until the material becomes liquid and forms a clear solution (transition c-l).
b) After 8 hours of storage at 70° C. and 100% of atmospheric humidity, the phosphite Ph-1 content is determined by liquid chromatography; the table shows the percentage of decomposed (hydrolysed) phosphite.

The results can be seen from Table 1 below. All percentages given are based on the weight of the phosphite present at the beginning of the test.

Tab. 1:
Stabilization of phosphite Ph-1 with sterically hindered amine P and with Triisopropanolamine (TIPA)

| Stabilizer: | none | TIPA | Amine P |
|---|---|---|---|
| Amount used: | 0 | 20% | 5% |
| Content of the solid: | 0 | 1.6% | 1,6% |
| a) Transition p-c: | 5 h | 56 h | 80 h |
| a) Transition c-1: | 27 h | 120 h | 168 h |
| b) % decomposition: | 85%* | 22.1% | 9.4% |

*after 2 hours

Examples 2–9: Compound Ph-1 is stabilized with amines C, E, H, J, K, P, Q and U by the method described in Example 1. The product obtained is tested for resistance to hydrolysis, as described in Example 1.

Examples 10–11: Compound Ph-2 is stabilized with amines N and O by the method described in Example 1. The product obtained is tested for resistance to hydrolysis, as described in Example 1.

Examples 12–15: Compound Ph-3 is stabilized with amines C, J, N and O by the method described in Example 1. The product obtained is tested for resistance to hydrolysis, as described in Example 1.

Examples 16–17: Compound Ph-5 is stabilized with amines N and O by the method described in Example 1. The product obtained is tested for resistance to hydrolysis, as described in Example 1.

Examples 18–19: Compound Ph-6 is stabilized with amines N and O by the method described in Example 1. The product obtained is tested for resistance to hydrolysis, as described in Example 1.

In all examples, the phosphites stabilized according to the invention exhibit excellent resistance to hydrolysis.

What is claimed is:
1. A composition stabilized against hydrolysis comprising
(a) 80 to 99.9% by weight of an organic phosphite or phosphonite or a mixture thereof; and
(b) 0.1 to 20% by weight, relative to the phosphite or phosphonite or mixture thereof, of a sterically hindered amine containing at least one group of the formula II

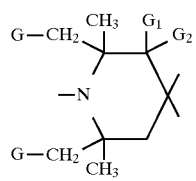

(II)

in which G is hydrogen or methyl and $G_1$ and $G_2$ are hydrogen, methyl or together are =O.

2. A composition according to claim 1, in which the molecular weight of the sterically hindered amine is in the range 1500 to 10,000.

3. A composition according to claim 1, which contains, apart from phosphite or phosphonite and sterically hindered amine, no organic polymers having a molecular weight of greater than 5000.

4. A composition according to claim 1, which contains the sterically hindered amine in an amount of 0.1 to 7.4% by weight, relative to the weight of the composition.

5. A composition stabilized against hydrolysis comprising
   (a) 80 to 99.9% by weight of an organic phosphite or phosphonite or a mixture thereof; and
   (b) 0.1 to 20% by weight, relative to the phosphite or phosphonite or mixture thereof, of a sterically hindered amine containing at least one group of the formula III

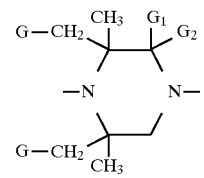

(III)

in which G is hydrogen or methyl and $G_1$ $G_2$ are hydrogen, methyl or together are =O.

6. A composition according to claim 5, which contains, apart from phosphite or phosphonite and sterically hindered amine, no organic polymers having a molecular weight of greater than 5000.

7. A composition according to claim 5, which contains the sterically hindered amine in an amount of 0.1 to 7.4% by weight, relative to the weight of the composition.

8. A composition according to claim 5, in which the molecular weight of the sterically hindered amine is in the range 1500 to 10,000.

* * * * *